United States Patent [19]

Frantz

[11] Patent Number: 5,435,863
[45] Date of Patent: Jul. 25, 1995

[54] METHOD FOR PROCESSING WORKPIECES BY ULTRASONIC ENERGY

[75] Inventor: Jeffrey L. Frantz, Southbury, Conn.

[73] Assignee: Branson Ultrasonics Corporation, Danbury, Conn.

[21] Appl. No.: 221,047

[22] Filed: Mar. 31, 1994

Related U.S. Application Data

[63] Continuation-in-part of Ser. No. 871,692, Apr. 21, 1992, abandoned.

[51] Int. Cl.⁶ .............................................. B32B 31/00
[52] U.S. Cl. ................................. 156/64; 156/73.1; 156/73.3; 156/358; 156/359
[58] Field of Search ................ 156/64, 73.1, 73.3, 156/73.4, 358, 359, 580.2; 264/23; 425/174.2

[56] References Cited

U.S. PATENT DOCUMENTS

| | | | |
|---|---|---|---|
| 3,432,691 | 3/1969 | Shoh | 310/316 |
| 3,469,211 | 9/1969 | Shoh et al. | 311/116 R |
| 3,733,238 | 5/1973 | Long et al. | 156/580.1 |
| 4,618,516 | 10/1986 | Sager | 156/73.1 X |
| 4,631,685 | 12/1986 | Peter | 156/73.1 X |
| 4,690,722 | 9/1987 | Flood | 156/73.1 X |
| 4,859,378 | 8/1989 | Wolcott | 156/73.1 X |
| 4,973,876 | 11/1990 | Roberts | 310/316 |

FOREIGN PATENT DOCUMENTS 903161  2/1982  U.S.S.R. .

Primary Examiner—David A. Simmons
Assistant Examiner—Paul M. Rivard
Attorney, Agent, or Firm—Polster, Lieder, Woodruff & Lucchesi

[57] ABSTRACT

An ultrasonic processing method is disclosed wherein during the processing time interval the motional amplitude of the resonating horn and thereby the power to the workpiece is reduced. The reduction in motional amplitude may be in response to a process condition such as a change in dimension of the workpiece or a sharp rise in the power curve, or it may be in response to the lapse of a predetermined time.

12 Claims, 3 Drawing Sheets

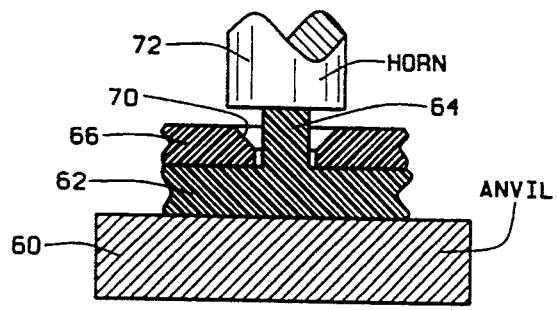
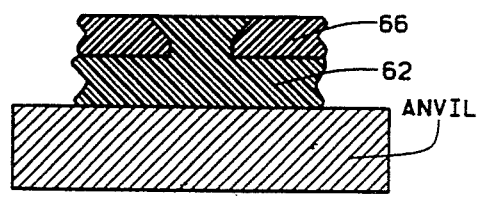
FIG. 10  FIG. 11
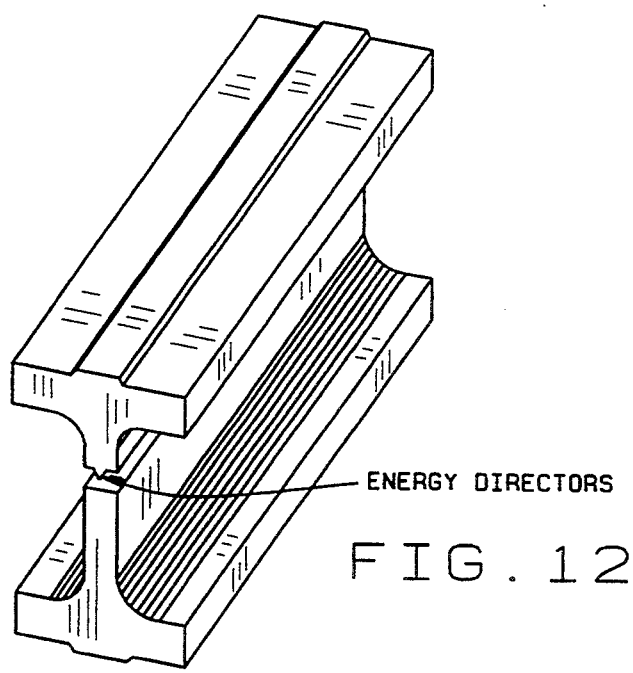
FIG. 12
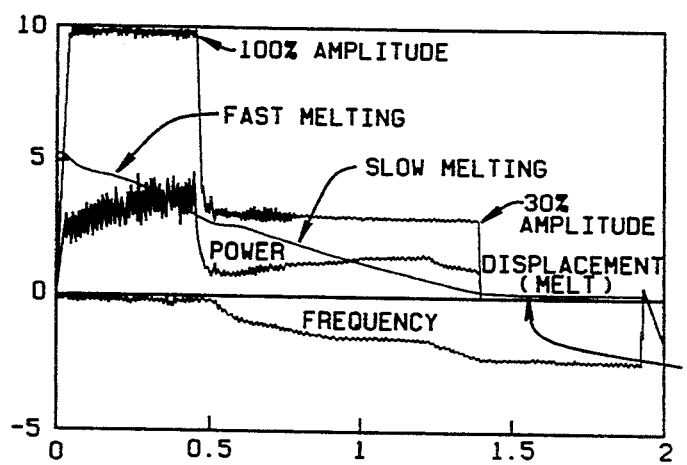
FIG. 13

METHOD FOR PROCESSING WORKPIECES BY ULTRASONIC ENERGY

CROSS REFERENCE TO A RELATED APPLICATION

This is a continuation-in-part application of U.S. patent application No. 07/871,692, filed Apr. 21, 1992, now abandoned.

BRIEF SUMMARY OF THE INVENTION

This invention concerns a method for processing workpieces by ultrasonic energy and, more specifically refers to a method for processing thermoplastic workpieces using vibratory energy in the ultrasonic frequency range for bonding, sealing or welding thermoplastic film and fabric materials as well as substantially rigid workpieces. Quite specifically, this invention concerns a method wherein the motional amplitude of the ultrasonically resonating horn in contact with the workpiece is varied during the processing time interval, thereby changing the power transmitted from the horn to the workpiece during such interval.

Welding thermoplastic workpieces and plunge sealing film and fabric materials by ultrasonic energy is well known. Generally, the workpiece is supported on an anvil. A horn, dimensioned to be resonant as a half wavelength resonator for high frequency vibrations of predetermined frequency traveling longitudinally therethrough, is brought into forced engagement with the workpiece for a time interval and, responsive to the horn being rendered resonant, ultrasonic energy is transmitted to the workpiece for causing a softening and flowing of thermoplastic material of the workpiece. Upon the cessation of the flow of ultrasonic energy, the softened and flowed material rigidifies, thereby establishing a bond or a weld.

In the past, it has been the common practice to retain the motional amplitude of the horn, i.e. the peak-to-peak mechanical excursion of the frontal horn surface in contact with the workpiece, constant during the entire time interval during which the horn is rendered resonant and transfers power to the workpiece. The present invention discloses an arrangement and method in which the motional amplitude of the horn, and thereby the ultrasonic power transmitted, is varied during the processing time interval in response to a control signal which may be responsive, for instance, to a change in power transmitted from the horn to the workpiece, a process related change of the workpiece dimension, a process related timing signal, or some other process related parameter.

The invention, which will be described in detail hereafter, has been made possible by the development of an improved electronic power supply disclosed in U.S. Pat. No. 4,973,876 issued to A. J. Roberts, dated Nov. 27, 1990, entitled "Ultrasonic Power Supply", which patent is specifically incorporated herein for reference. This power supply includes control means for adjusting the motional amplitude of the horn independent of line voltage or load fluctuations.

SUMMARY OF THE INVENTION

In the present invention, it has been discovered that a change (i.e., a lowering) of the motional amplitude of the horn effected either 1) in response to the power transmitted to the workpiece attaining a predetermined value with this lower power level being continued for the remainder of the preset weld cycle time interval, or 2) in response to a predetermined portion of the weld cycle's having elapsed, improves the resultant weld and diminishes tool wear, particularly in a condition in which the horn frontal surface strikes a metal anvil, as for instance, in plunge sealing and cutting thermoplastic film and fabric materials.

One of the objects of this invention is, therefore, the provision of an improved method for processing thermoplastic workpieces by the application of ultrasonic energy.

Another object of this invention is the provision of an apparatus and method of operating it for varying during the processing time interval the motional amplitude of the ultrasonically vibrating horn in forced engagement with a workpiece.

A further object of this invention is the provision of a method for processing workpieces by ultrasonic energy and varying the power transmitted to the workpiece in response to a process related control signal.

Still other and further objects of this invention will become more clearly apparent from the following description when taken in conjunction with the accompanying drawings.

BRIEF DESCRIPTION OF THE DRAWINGS

FIG. 10 is a somewhat diagrammatic view of two workpieces undergoing a staking or riveting operation in accordance with one embodiment of the method of the present invention;

FIG. 11 is a view corresponding to FIG. 10 of the workpieces of FIG. 10 after completion of the staking or riveting operation;

FIG. 12 is a perspective view of standard weld test specimens utilized in the test results hereinafter described; and FIG. 13 is a graphical representation of motional amplitude, displacement, power, and frequency of an ultrasonic welder in carrying out the welding method of the present invention, as described in the example set forth hereinafter.

Corresponding reference characters indicate corresponding parts throughout the several views of the drawings.

DESCRIPTION OF PREFERRED EMBODIMENTS

Figure 1:
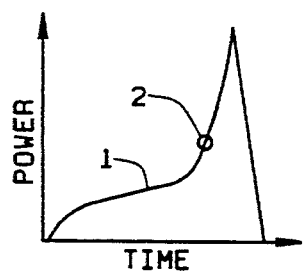
FIG. 1 is a graph depicting power vs. time in a typical ultrasonic cut and seal operation.

Referring now to the drawings and FIG. 1 in particular, there is shown a graph of power applied from the horn of an ultrasonic welder to the workpiece in a typical plunge type ultrasonic seal and cut operation, wherein two thermoplastic film or fabric materials, superposed upon one another, are disposed on a metal anvil, and a horn is brought into forced contact with the exposed workpiece surface to simultaneously cut through the two layers, separating them from the surrounding stock material, and welding the two layers of material along the cut edge. A typical example is the manufacture of a circular filter pad. Upon the horn contacting the workpiece with a predetermined force, the horn is rendered resonant and ultrasonic energy is coupled to the workpiece, thus starting a time interval (also known as the weld cycle time interval or the cut and seal cycle time), as shown by curve 1. After some passage of time during the time interval, the horn cuts through the workpiece and the horn establishes direct metal-to-metal contact with the metal anvil. At that point during the weld cycle time interval, as indicated at point 2 in FIG. 1, the power flow rises rapidly as a result of the lower acoustic impedance of the anvil and the now reduced energy dissipation by the workpiece. The power continues to rise sharply until the end of the weld cycle time interval, generally a preset (or predetermined) time interval.

In production, the repetitive high frequency impact of the horn in direct metal-to-metal contact with the anvil, which occurs with a force of several thousand gravities, and the somewhat scrubbing motion of the vibrating horn causes a relatively rapid wear of the impacting anvil and horn surfaces. This oftentimes necessitates the early refinishing of the surfaces or replacement of the horn and anvil. In typical instances, the front surface of the horn becomes grooved and the knife-shaped cutting surface of the anvil becomes dull thus adversely affecting the ability of the ultrasonic welder to carry out its intended welding functions.

Figure 2:
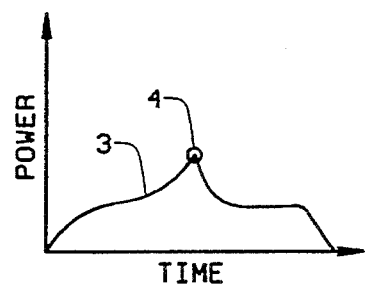
FIG. 2 is a graph similar to FIG. 1, but reducing the motional amplitude of the horn when the power attains a predetermined level.

FIG. 2 shows the improved arrangement of the present invention. In response to the rise of the power transfer, as shown by the portion of the power vs. time curve indicated by numeral 3 starting at the origin and continuing to point 4 which corresponds to the metal-to-metal contact, a control signal is produced which, in turn, causes a reduction of the power transferred for the remainder of the cut and seal cycle by reducing the motional amplitude of the horn. Thus, the power provided for the remainder of the cut and seal cycle is limited. The reduction of power has effected a dramatic reduction of the mechanical wear apparent at the frontal surface of the horn and at the raised anvil cutting surface.

Figure 3:
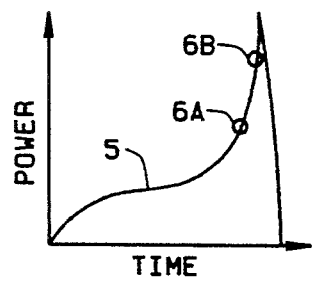
FIG. 3 is a graph similar to FIG. 1 when producing a filter comprising two superposed non-woven materials.

FIG. 3 depicts a graph of power vs. time when welding two superposed layers of non-woven thermoplastic material for producing a filter. The portion 5 of the curve from the origin to the point 6A is similar to the portion of the curve in FIG. 1 from the origin to point 2. As the filter material melts, there is evident a short period of time during the weld cycle (this short period of time being referred to as a window) between the time a good bond condition may be effected, as indicated at 6A, and the time an overwelded condition is effected, as indicated at 6B. The power curve 5 of prior art welding apparatus and methods provides a very narrow time window (between points 6A and 6B) for achieving a good product. As will be hereinafter described, the method of the present invention greatly lengthens the window during the predetermined weld cycle during which a good bond condition may be achieved. In addition, the method of this invention permits a wider range of weld parameters and yet will result in good bond condition welds which are much more repeatable in actual production conditions.

Figure 4:
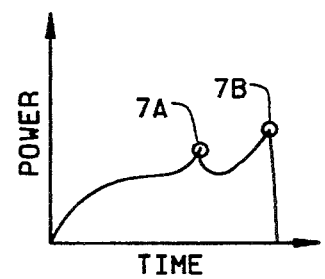
FIG. 4 is a graph of power vs. time when the power level is reduced during the time interval of producing a filter.

FIG. 4 shows the condition wherein by reducing the motional amplitude of the horn, as indicated at 7A, at the time the power would normally increase sharply due to the material having reached a melted condition, the time window, as indicated by the change in time between points 7A and 7B, available for producing a good product is widened considerably. It will be apparent that once the material has reached its melted state, there is no need for increasing power. A relatively low power level will suffice to complete the weld cycle. Additionally, providing a wider time window in which good welds may be made allows wider tolerances for many of the weld parameters (including weld power, material thickness and other variations, horn characteristics and other variables).

The novel arrangement disclosed herein is applicable also to the process of welding substantially rigid thermoplastic workpieces, for instance, when joining two parts, one being provided with a projection, also known as energy director, which responsive to the dissipation of ultrasonic energy melts and collapses, the molten material filling a recess which may be optionally provided in the other part, as shown for instance in U.S. Pat. No. 4,618,516 dated Nov. 21, 1986, issued to T. B. Sager, entitled "Ultrasonic Welding of Thermoplastic Workpieces". Such an energy director is shown at 71 in FIG. 12. In accordance with the present invention, the ultrasonic horn transmits ultrasonic energy to the stacked parts during a first portion of the predetermined time interval or weld cycle at a first motional amplitude so as to heat the interface between the two parts and the energy director at a first heating rate. After initial softening and flowing of thermoplastic material has occurred, as may be determined by sensing when the energy director has partially melted or which may be determined by the passage of a preset portion of the time interval (weld cycle), the power (motional amplitude of the horn) necessary to complete the weld cycle is decreased to a second (lower) motional amplitude level for the remainder of the weld cycle so as to continue heating the material at a second or lower heating rate. The reduction in power with the consequent lower heating rate has been observed to reduce the presence of visible flash and the presence of voids in the weld. The voids result from cavitation in the melted material and their existence weakens the weld. The result is a process which makes welds more easily and repeatably, which gives a wider degree of process tolerances, and which produces stronger welds than the prior art ultrasonic welding processes.

The control signal for effecting the reduction of the motional amplitude can also be responsive to the value of the power provided to the workpiece as illustrated heretofore, or can be responsive to other parameters of the process. For example, a control signal can be produced in response to a predetermined amount of time elapsed in the weld cycle. Other control signals can be produced in response to a changing mechanical dimension of the workpiece assembly as sensed, for instance, by mechanical sensing means, optical sensing means, or an eddy current sensing device, see U.S. Pat. No. 4,631,685 dated Dec. 23, 1986 issued to D. A. Peter, entitled "Method and Apparatus for Ultrasonic Plastic Forming and Joining". Therefore, in a typical application, the reduction of power transmitted may be effected when, for example, fifty percent (50%) of the collapse of the energy director is sensed or has been established experimentally. In the latter case, the control signal can be responsive to time elapsed in the weld cycle.

As will be apparent to those skilled in the art, the reduction of motional amplitude of the horn does not need to occur abruptly or as a single step. A varying or dynamic control signal may be provided, produced for instance by a function generator which is triggered upon the start of the weld cycle. In this manner, a continuously varying power output can be achieved. The latter arrangement is particularly useful when welding difficult-to-weld workpieces as caused by the composition of the thermoplastic material.

Figure 5:
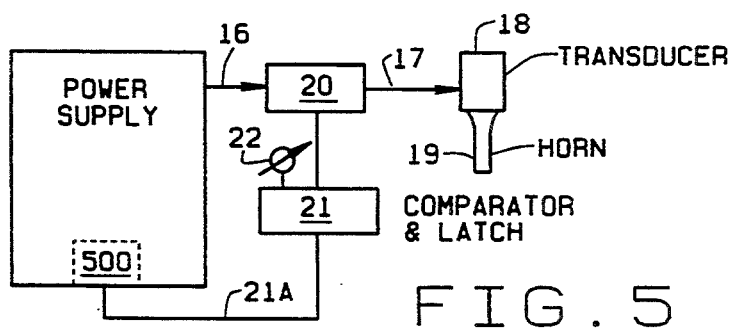
FIG. 5 is a schematic illustration of a typical embodiment of an apparatus for the invention.

FIGS. 5-8 show schematically an apparatus for the present invention. As stated hereinabove, the power supply shown in U.S. Pat. No. 4,973,876 which includes a voltage control circuit, see FIGS. 1 and 8 of the last-mentioned U.S. patent, is well suited for varying the power applied to the workpiece. With reference to FIG. 5, the conductor 16 from the power supply 8 leads to a power meter 20 for sensing the electrical power supplied via conductor 17 to the electroacoustic transducer 18, which is fitted with a horn 19. A comparator and latch circuit 21 receives a signal commensurate with the power to the transducer 18. An adjustment control 22 provides a variable reference signal adjustment to the comparator and when the power commensurate signal exceeds the reference signal, the comparator provides an output signal which is locked on by the latch circuit and fed as a control signal via conductor 21A to the voltage control circuit 500 forming a part of the power supply. The voltage control circuit, in turn, causes a change in the motional amplitude of the horn as described in the patent supra.

Figure 6:
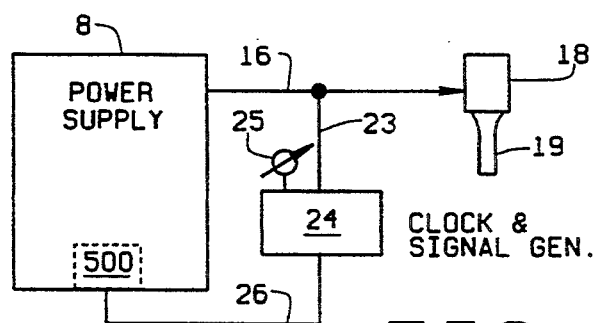
FIG. 6 is a schematic illustration showing an alternative embodiment of an apparatus for the invention.

FIG. 6 shows schematically the use of a time responsive signal. Conductor 23 causes a set/reset signal to be applied to the clock and signal generator 24 actuated by a set signal responsive to the start of power flow to the transducer 18. When the clock circuit receives the signal via conductor 23 and the clock reaches a preset point in time, settable by adjustment 25, the signal generator via conductor 26 provides a control signal to the voltage control circuit 500 for changing the power level to the transducer. When the power transfer stops at the end of the time interval during which power flows, the circuit 24 is reset.

Figure 7:
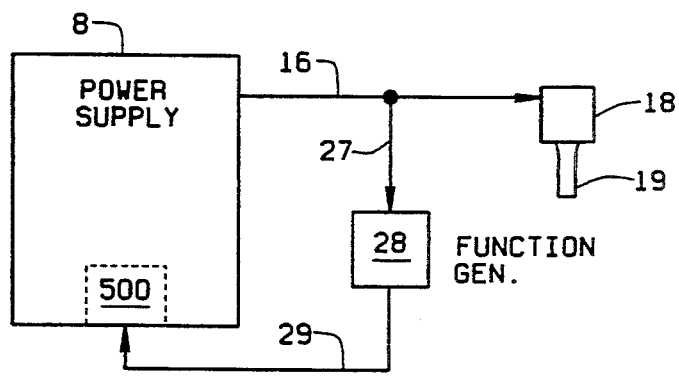
FIG. 7 is a schematic illustration of a further alternative embodiment of an apparatus for the invention.

FIG. 7 is a similar arrangement as shown in the preceding figures, except a function generator 28, started upon the receipt of a signal via conductor 27, sends a varying control signal via conductor 29 to the voltage control circuit 500.

Figure 8:
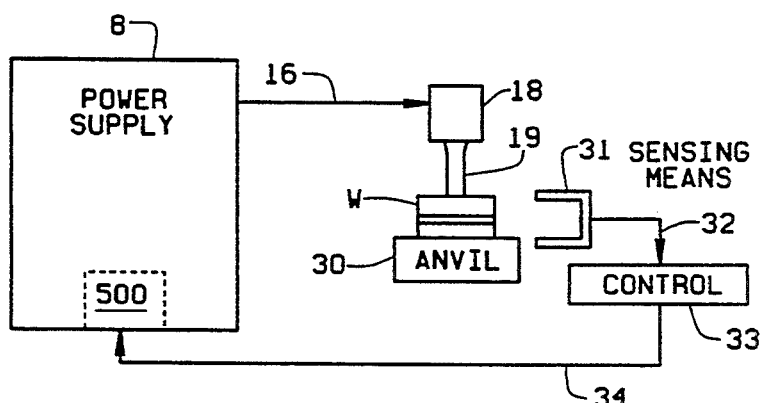
FIG. 8 is a schematic illustration of still another embodiment of an apparatus suitable for the invention.

FIG. 8 depicts the horn 19 in forced contact with a workpiece W to be welded and supported on an anvil 30. A suitable sensing means 31, senses the change of dimension of the workpiece during welding together the two workpiece halves. As stated above, suitable sensing means comprise optical, electrical, acoustic or mechanical sensing means well known in the art. When the workpiece dimension changes to a predetermined value, as noted by the control circuit 33 receiving a dimension responsive signal via conductor 32, a control signal is provided via conductor 34 to the voltage control circuit 500 of the power supply 8. Again, the control signal serves to cause a change in the motional amplitude of the horn and thereby a change in the power transmitted from the power supply to the electroacoustic transducer, horn and workpiece.

Figure 9:
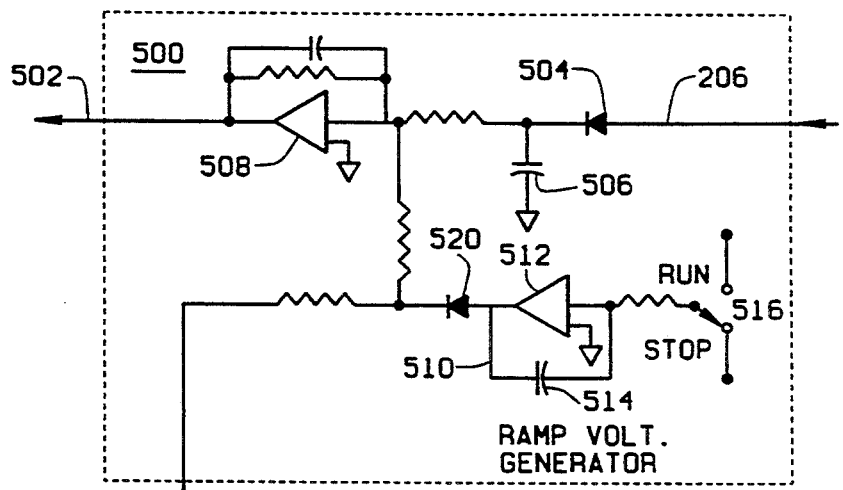
FIG. 9 is a schematic electrical circuit diagram.

FIG. 9 shows the voltage control circuit shown in the patent to Roberts, supra. The amplitude control adjustment via variable resistor 518 shown in the patent has been eliminated and replaced by the control signal carrying conductor 21A, 26, 29 or 34. All other circuit features are as described in the patent.

Another application in which a function generator 28, as shown in FIG. 7, will be useful is the rotary drum sealing arrangement, see for example U.S. Pat. No. 3,733,238 issued to D. D. Long et al, dated May 15, 1973 entitled "Apparatus for Vibration Welding of Sheet Material", or U.S. Pat. No. 4,690,722 issued to G. N. Flood, dated Sep. 1, 1987 entitled "Ultrasonic Apparatus for Joining and Severing Sheet Material". In such an application the function generator preferably provides a changing signal to cause a modulated power output. This can be achieved by a triangular, trapezoidal or sinusoidal control signal, or some other periodically changing signal.

The above-described process is applicable also for staking and riveting two parts to one another. As seen in FIG. 10, numeral 60 designates an anvil supporting a first thermoplastic part or workpiece 62 which is provided with an upstanding stud 64, preferably of circular cross-section A second part or workpiece 66, which may be of thermoplasic or non-thermoplastic material, is superposed on the workpiece 62 and has an aperture 68 through which the stud 64 extends. The workpiece 66 is provided also with a chamfer 70 for forming a recess adapted to receive and be filled with melted and displaced thermoplastic material from the stud 64 during the deformation of the stud responsive to the dissipation of ultrasonic energy which is transferred from the horn 72 to the extended upper surface of the stud by forced contact between the horn and the stud. As the horn transfers ultrasonic energy to the stud, the stud 64 melts at its upper portion causing the melted and displaced material to fill the gap between the stud 64 and the surrounding workpiece 66, thus creating a staked or riveted assembly as seen in FIG. 11. Causing the motional amplitude of the horn to undergo a change from an initial high amplitude for initiating the softening and flowing of thermoplastic material to a lower motional amplitude for completing the displacement of melted material during the latter part of the process interval produces a stronger assembly and a more pleasing appearance of the final product because of the reduced splatter of thermoplastic material. This is true, in particular, when the thermoplastic material comprises a crystalline structure or is a material with a high filler content.

TEST RESULTS

Tests were conducted to determine the effect of motional amplitude control on the strength of welds using an ultrasonic welding apparatus. The tests utilized an ultrasonic welder commercially available from Branson Ultrasonics Corporation of Danbury, Conn. (Model 920MA, GUI, WPC-1 using a "smart actuator"). The test specimens were standard samples as defined by the American Welding Society (AWS), as shown in FIG.

12, of two different thermoplastic resins: ABS (acrylonitrile-butadiene-styrene) and PC (polycarbonate). The joint to be welded used an energy director (as shown in FIG. 12), such as is described in the co-assigned U.S. Pat. No. 4,618,516. The ultrasonic horn used was a standard 2"×¾" blade horn. The test procedure was to weld a number of the specimens at different welding parameters and maximum achievable strength without varying the amplitude during the weld cycle, a three variable, five level experimental design was completed and the results were used to generate a polynomial expression of weld strength in term of the parameters evaluated. The parameters that were examined were as follows:

|  |  |
| --- | --- |
| Weld Time | 100 to 500 mS |
| Weld Force | 82 to 294 lbs. |
| Trigger Force (for initiating weld cycle) | 10 to 80 lbs. |

The booster horn on the welding machine had a gain of 1:2.0 and the hold time was set over 1.0 second to insure solidification of the weld. After the specimens had been welded, they were subjected to standard tensile testing to determine the strength of the weld in resisting tension loading.

ABS Test Specimens

The results showed that the best welds could be obtained with the following parameters:

| Time (mS) | Energy (J) | Press. (psig) | Pk Pwr. (%) | Collapse (in.) | Booster (Gain) | Dnw. Spd. (in./S) | Strength (lbs.) | SD (±lbs) |
| --- | --- | --- | --- | --- | --- | --- | --- | --- |
| 275 | 260 | 51 | 61.5 | 0.0683 | 2.0 | 1.4 | 658 | 82 |

100% amplitude during the entire weld cycle.

A second experimental design was constructed in which the amplitude was varied from 70% to 100% during the last portion of the weld cycle. The variables that were varied were:

|  |  |
| --- | --- |
| Final weld amplitude | 70 to 100% |
| Time amplitude was changed | 100 to 210 mS |

In these experiments the amplitude was 100% at the start of the weld. Once the trigger time (time to change amplitude) was reached, the amplitude would be sloped to the final amplitude over the remaining weld time.

The results from the experiments indicated that the following parameters were the best:

The amplitude was ramped from 100% to 90% at 180 mS into the weld cycle.

These test results using ABS test specimens and with substantially identical weld parameters, except that in the second test the amplitude was decreased from 100% to 90% at approximately 180 mS (i.e., about 65% of the preset weld time), showed that the weld strength could be improved slightly from 658 lbs. to 721 lbs. (about a 9.5% increase). However, the consistency of the weld was greatly improved as the standard deviation decreased from ±82 lbs. to ±22 lbs., a four-fold decrease.

The second set of experiments evaluated dropping the amplitude in step wise fashion instead of ramping the amplitude down slowly. It was found that by triggering to the lower amplitude responsive to a preset power level, the same results could be obtained. The average strength was 730 lbs. with a standard deviation (SD) of ±30 lbs.

The last experiments conducted with this ABS material included dropping the amplitude early into the weld cycle, 200 to 400 mS from the start of the weld cycle, below 50% in a stepwise fashion. In these experiments, the best conditions and results are shown below:

| Time (mS) | Energy (J) | Press. (psig) | Pk Pwr. (%) | Collapse (in.) | Booster (Gain) | Dnw. Spd. (in./S) | Strength (lbs.) | SD (±lbs) |
| --- | --- | --- | --- | --- | --- | --- | --- | --- |
| 1700 | 441 | 25 | 32.4 | 0.1078 | 1.5 | 0.75 | 1014 | 100 |

The amplitude was dropped from 100% to 30% at 250 mS into the weld cycle.

In the above testing, the same weld samples were used, but the horn amplitude was decreased from 100% to 25% after 15% into the preset weld cycle time interval. It will be noted that the average weld strength increase to 1,014 lbs. with a standard deviation of ±100 lbs. It is important to note that the time interval was lengthened from 275 and 280 mS to 1700 mS. It should be noted, however, that a weld cycle of about 275–280 mS is not sufficiently long to obtain a sufficient melt of the thermoplastic (ABS) resin material. Further, it will be noted that a weld cycle time of 1700 mS at 100% horn amplitude would be too long and it would result in highly unwanted burning of the plastic material.

The curves depicting amplitude, power displacement and frequency as a function of time over the weld cycle (about 2 seconds) are shown in FIG. 13. These results show a significant increase in strength, from 658 lbs. to 1014 lbs. for the test parameters indicated.

Additional welds were made with similar parameters without varying the amplitude. The results for these tests are listed below:

| Time (mS) | Energy (J) | Press. (psig) | Pk Pwr. (%) | Collapse (in.) | Booster (Gain) | Dnw. Spd. (in./S) | Strength (lbs.) | SD (±lbs) |
| --- | --- | --- | --- | --- | --- | --- | --- | --- |
| 280 | 268 | 51 | 61.8 | 0.0677 | 2.0 | 1.4 | 712 | 22 |

| Time (mS) | Energy (J) | Press. (psig) | Pk Pwr. (%) | Collapse (in.) | Booster (Gain) | Dnw. Spd. (in./S) | Strength (lbs.) | SD (±lbs) |
|---|---|---|---|---|---|---|---|---|
| 1000 | 495 | 25 | 36.5 | 0.1126 | 1.0 | 1.4 | 636 | N/A |
| 650 | 480 | 25 | 56.5 | 0.0876 | 1.0 | 1.4 | 685 | N/A |
| 800 | 559 | | | 0.104 | 1.5 | | 548 | 147 |

The amplitude was maintained at 100% during the entire weld cycle.

Polycarbonate (PC) Test Specimens

Tests similar to the above described tests using ABS thermoplastic test specimens were also run using polycarbonate test specimens.

| Without amplitude control: | | | | | | | | |
|---|---|---|---|---|---|---|---|---|
| Time (mS) | Energy (J) | Press. (psig) | Pk Pwr. (%) | Collapse (in.) | Booster (Gain) | Dnw. Spd. (in./S) | Strength (lbs.) | SD (±lbs) |
| 660 | 394 | 25 | 41.5 | 0.0666 | 1.5 | 0.72 | 599 | N/A |

100% amplitude was maintained throughout the weld cycle.

| With amplitude control: | | | | | | | | |
|---|---|---|---|---|---|---|---|---|
| Time (mS) | Energy (J) | Press. (psig) | Pk Pwr. (%) | Collapse (in.) | Booster (Gain) | Dnw. Spd. (in./S) | Strength (lbs.) | SD (±lbs) |
| 1400 | 314 | 25 | 33.7 | 0.0706 | 1.5 | 0.72 | 1734 | 22 |

The amplitude was dropped from 100% to 25% at 400 mS into the weld cycle.

As shown from the above tests, the weld strength was increased from 599 lbs. to 1734 lbs. when the amplitude of the horn was reduced from 100% to 25% after 400 mS into a 1400 mS weld cycle. It should be noted that the weld cycle time was increased from 660 to 1400 mS. Again, it is pointed out that a weld cycle time of 1400 mS at 100% amplitude would result in burning of the polycarbonate material and that too little power over a shorter weld cycle would not result in sufficient melting of the thermoplastic PC material so as to result in a satisfactory weld.

While there have been described and illustrated certain preferred embodiments of the invention, it will be apparent to those skilled in the art that various further changes and modifications may be without departing from the principle and spirit of this invention, which shall be limited only by the scope of the appended claims.

What is claimed is:

1. An ultrasonic welding method in which a horn adapted to be mechanically resonant as a half wavelength resonator is brought into forced contact with a workpiece for transmitting, when the horn is rendered resonant, ultrasonic energy to the workpiece during a predetermined time interval, the improvement comprising the steps of:
   lowering the motional amplitude of said horn in response to the power transmitted by the horn to the workpiece attaining a predetermined value, and
   continuing to operate said horn at said lower motional amplitude for the remainder of said predetermined time interval whereby the time window during which optimal welding results are achieved is widened and whereby wider tolerances of weld parameters are tolerable and yet optimal welding results are achieved.

2. An ultrasonic welding method in which a horn adapted to be mechanically resonant as a half wavelength resonator is brought into forced contact with a workpiece for transmitting when the horn is rendered resonant ultrasonic energy to the workpiece during a predetermined time interval, said workpiece being of a suitable thermoplastic material, said method comprising the steps of:
   measuring the power transmitted from said horn to the workpiece;
   when the power attains a predetermined level, generating a control signal;
   in response to said control signal, causing said horn to be resonant at a lower motional amplitude than the amplitude at which the horn was resonant prior to the generation of said control signal, and
   continuing the operation of said resonant horn at said lower motional amplitude during the remainder of the time interval whereby wear on said horn is reduced.

3. An ultrasonic welding method in which a horn adapted to be mechanically resonant as a half wavelength resonator is brought into forced contact with a workpiece supported on a metallic anvil for transmitting when the horn is rendered resonant ultrasonic energy to the workpiece during a predetermined time interval, said workpiece being of a suitable thermoplastic material, said method comprising the steps of:
   energizing said horn at a high motional amplitude;
   sensing the establishment of metal-to-metal contact between said horn and said anvil thereby indicating that said thermoplastic material in the area contacted by said horn substantially has melted; and
   lowering the motional amplitude of said horn to a lower power level for the remainder of said predetermined time interval thereby to increase the time during said predetermined time interval during which optimal welds are achieved.

4. The method of softening and deforming a portion of a thermoplastic workpiece by ultrasonic vibrations comprising: providing forced engagement between said portion and a horn adapted to be resonant at a predetermined frequency in the ultrasonic frequency range; rendering said horn resonant at a first motional amplitude during a first portion of a preset time interval, and maintaining said horn resonant at a reduced motional amplitude during a second and final portion of said time interval.

5. The method of obtaining improved weld strength between two or more thermoplastic parts which are to be joined along a common interface surface and wherein a horn rendered resonant at an ultrasonic frequency applies during a preset time interval ultrasonic vibrations to said parts contacting one another along said interface surface, the improvement comprising:
rendering the horn resonant at a first motional amplitude during a first portion of said preset interval; and
after the lapse of a predetermined time in said preset time interval rendering said horn resonant at a second motional amplitude during the remainder of said time interval thereby to lengthen the time during said interval during which a good bond condition may be effected between said thermoplastic parts.

6. The method of claim 5 wherein said second motional amplitude is lower than said first motional amplitude.

7. A method of cutting two layers of suitable thermoplastic sheet or film material superposed on one another from the stock material and of sealing the layers of material to one another along at least selected areas of the edges formed upon cutting the layers from the stock material, said method comprising the steps of:
superposing two layers of said thermoplastic material on a suitable metallic anvil or the like;
bringing an ultrasonic horn into working engagement with said layers, the areas of contact between said horn and said layers constituting the areas of said layers to be cut from said stock material and to be welded to one another;
rendering said horn mechanically resonant for transmitting ultrasonic energy at a first motional amplitude level to said workpieces for a predetermined time interval;
in response to sensing metal-to-metal contact between said horn and said anvil indicating that said thermoplastic layers have been cut through, lowering said motional amplitude of said horn thereby to reduce wear upon said horn and anvil; and
maintaining said lower motional amplitude of said horn for the remainder of said predetermined time interval thereby to permit said material in the areas in proximity to said cuts through said material to further heat said proximate material to a temperature sufficient to weld said layers of material together along said edges formed upon cutting the layers from said stock material wherein the time window during which welds of good strength may be formed is lengthened.

8. An ultrasonic energy processing method for welding two substantially rigid thermoplastic parts together, said parts being stacked one on one another with the upper of said parts being engaged by a horn adapted for transmitting ultrasonic energy to said stacked parts for a predetermined time interval, said stacked parts being supported on a suitable anvil or the like, each of said parts having a surface to be joined to the other of said parts, said surface of one of said parts having an energy director thereon, said method comprising the steps of:
energizing said ultrasonic horn during a first portion of said predetermined time interval at a first motional amplitude so as to heat said energy director and said surfaces of said parts at a first heating rate;
generating a signal responsive to the melting and collapsing of said energy director; and
in response to said signal, lowering said motional amplitude of said horn for the remainder of said predetermined time interval so as continue to heat said surfaces of both of said parts at a second heating rate lower than said first heating rate to a temperature sufficient to weld said surfaces together.

9. The method of claim 8 wherein said step of lowering said motional amplitude results in minimizing the visible flash between said surfaces of said parts following welding.

10. The method of claim 8 wherein said step of lowering said motional amplitude further results in minimizing voids within said weld between said surfaces of said parts.

11. An ultrasonic energy processing method for welding two substantially rigid thermoplastic parts together, said parts being stacked one on one another with the upper of said parts being engaged by a horn adapted for transmitting ultrasonic energy to said stacked parts for a predetermined time interval, said stacked parts being supported on a suitable anvil or the like, each of said parts having a surface to be joined to the other of said parts, said method comprising the steps of:
energizing said ultrasonic horn for a first portion of said predetermined time interval at a first motional amplitude;
after the lapse of a predetermined portion of said predetermined time interval, lowering the motional amplitude of said horn for the remainder of said predetermined time interval whereby the integrity and strength of the weld joining the parts to one another are significantly improved on account of a substantial absence of voids in the weld, and the appearance of the parts is improved due to a minimum of visible flash material at the welded area.

12. The method of welding two thermoplastic workpieces to one another along a common interface surface by ultrasonic energy comprising: a step of providing a horn adapted to be resonant at an ultrasonic frequency; a step of rendering said horn resonant and causing said horn to transmit ultrasonic vibrations to said interface surface for a preset time interval whereby the dissipation of ultrasonic energy causes a softening and flowing of thermoplastic material at said interface surface, said step of rendering said horn resonant comprising rendering said horn resonant at a first motional amplitude during an initial portion of said time interval and rendering said horn resonant at a lower motional amplitude during the succeeding portion of said interval.

* * * * *